March 19, 1968 G. S. EAGER, JR., ETAL 3,374,428
APPARATUS FOR DETECTING AND RECORDING CORONA DISCHARGE
IN A MOVING INSULATED POWER CABLE HAVING
A SEMICONDUCTING INSULATION SHIELD
Filed Sept. 20, 1966 2 Sheets-Sheet 1

*INVENTORS*
GEORGE S. EAGER, JR.
GEORGE BADER
BY Sandoe, Neill,
Schaller & Wikstrom
ATTORNEYS

March 19, 1968  G. S. EAGER, JR., ET AL  3,374,428
APPARATUS FOR DETECTING AND RECORDING CORONA DISCHARGE
IN A MOVING INSULATED POWER CABLE HAVING
A SEMICONDUCTING INSULATION SHIELD
Filed Sept. 20, 1966  2 Sheets-Sheet 2

FIG.2

*INVENTORS*
GEORGE S. EAGER JR.
GEORGE BADER
BY
ATTORNEYS

United States Patent Office 3,374,428
Patented Mar. 19, 1968

3,374,428
APPARATUS FOR DETECTING AND RECORDING CORONA DISCHARGE IN A MOVING INSULATED POWER CABLE HAVING A SEMICONDUCTING INSULATION SHIELD
George S. Eager, Jr., Upper Montclair, and George Bader, Metuchen, N.J., assignors to General Cable Corporation, New York, N.Y., a corporation of New Jersey
Filed Sept. 20, 1966, Ser. No. 580,799
5 Claims. (Cl. 324—54)

ABSTRACT OF THE DISCLOSURE

Apparatus for detecting and recording corona discharges generated within the insulation of an insulated power cable having a semiconducting insulation shield as the cable moves continuously through a liquid-filled test bushing having a plurality of spaced electrodes in contact with the liquid. This is an extension of the invention disclosed in applicants' Patent No. 3,346,809, which discloses apparatus for continuously measuring ionization inception voltage and ionization extinction voltage in an unshielded insulated conductor. In the present invention the high voltage source is applied to the cable under test for a short time, followed by a longer interval during which no voltage is applied, in order to permit dissipation of heat developed by current flow in the insulation shield. False indications which might result from switching surges are prevented by synchronously gating the passage of the detector signal to the recorder with the opening and closing of the switch which controls application of the high voltage.

Background and summary of the invention

This invention relates to the cable manufacturing art and, more particularly, relates to a method and apparatus for detection of corona discharge in electrical cable having a semiconducting insulation shield.

Continuous monitoring of cable to detect corona discharges as, for example, in voids in the insulation on such cable is known to the art. Most methods in use today involve moving the cable continuously through a corona probe apparatus in which a section of the cable is immersed in liquid. The liquid surrounds the cable to prevent external corona discharge. Electrodes contact the liquid to apply a voltage stress across the insulation. The positioning of the electrodes provides a predetermined voltage distribution usually starting at zero as the cable enters the probe, increasing to a preset maximum value in the center of the probe and decreasing again to zero at the termination of the probe.

Under such conditions, the portion of the cable moving through the detector probe is not only subjected to a radial voltage stress across the insulation but is also subjected to a longitudinal voltage stress along the axis of the cable. The longitudinal voltage stress results in a longitudinal current flow through the liquid used in the corona probe. By adjustment of the resistivity of the liquid, the amount of heat produced can be maintained relatively low so as to be easily dissipated by cooling systems.

However, when testing cable having a semiconducting insulation shield, additional longitudinal current flow will exist in the semiconductor shield. Since the axial resistance of the insulation shield is much lower than the resistance of the liquid, the current flow through the insulation shield will be much higher than that through the liquid. As a result, the amount of heat developed in the insulation shield will often be higher than that capable of dissipation by the cooling system and the cable will be damaged during corona testing.

It is, therefore, an object of the present invention to provide a method and apparatus for continuous testing cables with semiconducting shields for corona.

In accordance with this object, there is provided, in a preferred embodiment of this invention, a corona probe consisting of an elongated tubular body. The cable under test is fed in continuous manner into one end of the body and is pulled from the other end thereof. At the entrance and exist end, washers are provided so that the probe is liquid-tight and so that the surface of the cable is wiped upon entering into the probe. The probe is filled with liquid to surround the cable moving therethrough.

Grounded electrodes are positioned at each end of the probe. A high voltage electrode is positioned at the center of the probe, thereby to provide an electrical stress on the cable, increasing from zero at the ends of the probe to a maximum at the midpoint thereof.

A high voltage transformer is provided having the high voltage winding thereof coupled to the high voltage electrode. The low voltage winding of the transformer is coupled to an alternating source through a switching arrangement. The switch is energized to apply a high voltage source to the cable under test for a short time followed by a longer interval during which voltage is not applied. For example, the high voltage may be applied for one or two cycles at the line frequency followed by a period of ten to twenty cycles during which no voltage is applied. It is preferred that the ratio of off time to on time be maintained at approximately 10:1.

Detector probes are provided to detect corona discharge during the application of high voltage stress to the cable. Corona discharge can be detected within the period of one to two cycles. The following off time of ten to twenty cycles permits the heat built up in the semiconductor insulation to dissipate.

In order to prevent surges from the switch operation from being picked up by the detectors as false indications, the output from the detector is gated synchronously with the opening and closing of the switch. Thus, the gate is closed until the switch has been closed, then the gate is opened for passage of the detector signal to suitable detector circuitry. The gate is then closed prior to opening of the switch.

When desired, the voltage amplitude for corona inception or extinction may be determined by providing detector circuitry including a capacitor stack extending along the longitudinal axis of the probe and coupled to suitable detector circuitry.

Brief description of the drawings

Having briefly described this invention, it will be described in greater detail along with other objects and advantages in the following portions of the specification, which may best be understood by reference to the accompanying drawings, of which:

FIG. 2 is a partially sectioned elevation view, partially in schematic form of another embodiment of the present invention.

Description of the preferred embodiment

Figure 1:
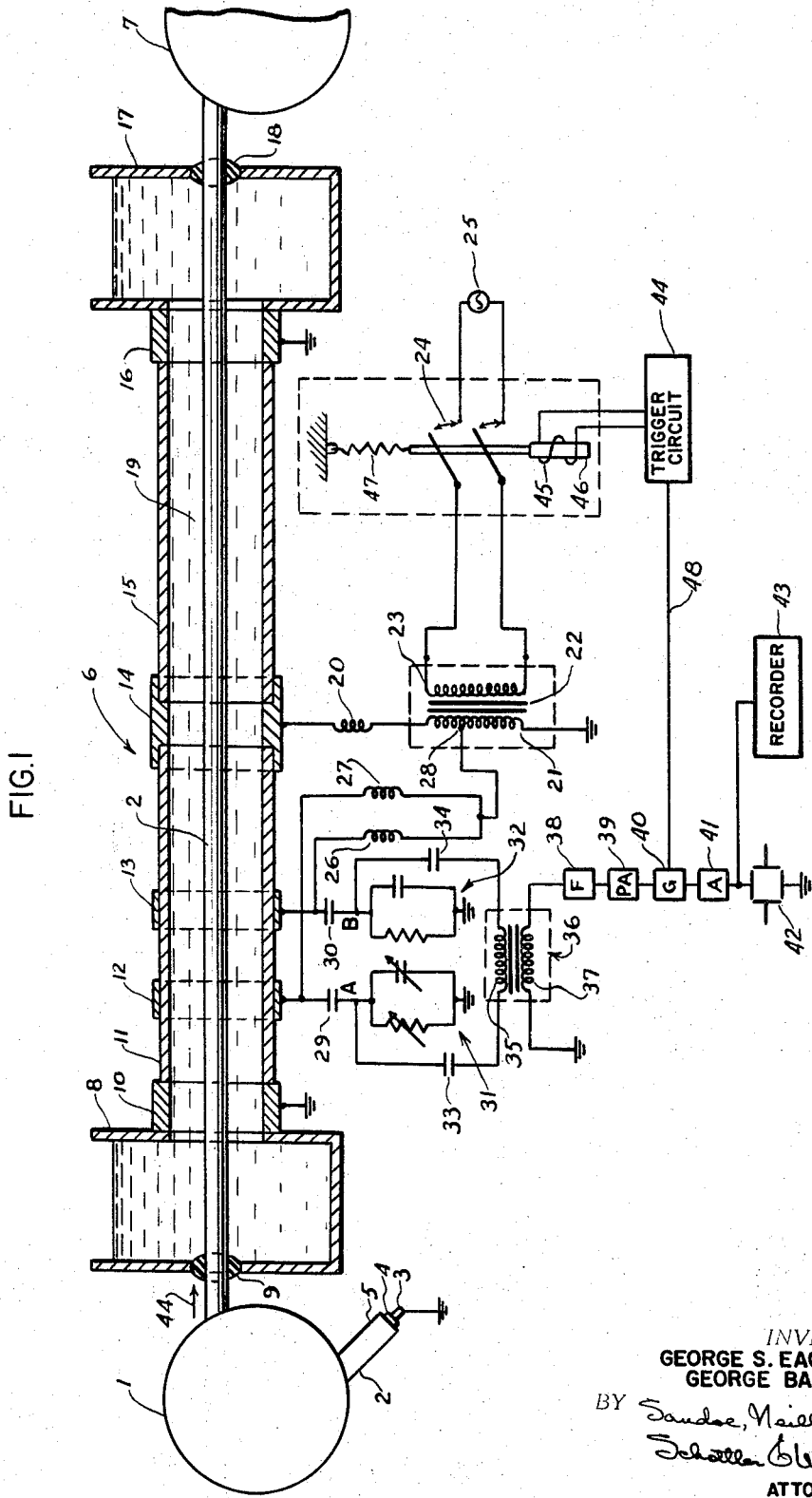
FIG. 1 is a partially sectioned elevation view, partially in schematic form of a corona probe in accordance with the present invention.

In FIG. 1, there is shown apparatus for the continuous detection of corona in electrical cable which consists of a playoff reel to support the cable 2 to be tested. The cable consists of a central conductor core 3, insulation 4 and a semiconducting insulation shield 5. The core is continuously grounded and after passage of the cable over the payoff reel through the probe 6, the cable is pulled up on the takeup reel 7. The corona probe 6 consists of a first tank 8 at the entrance end of the probe. A washer 9 is provided surrounding the cable to render the tank watertight and to wipe the cable periphery, preventing air bubbles on the surface thereof as the cable passes through the probe. Extending axially from the first tank 8, the probe is provided with a first cylindrical grounded electrode 10, a first insulating tube 11, pick up electrodes 12 and 13, a high voltage cylindrical electrode 14, a second insulated tube 15, a second cylindrical grounded electrode 16, and a second tank 17 having a washer 18 at the exit end thereof. The entire probe is filled with liquid 19.

To energize the center high voltage electrode, there is provided a high voltage transformer 22. The center electrode is coupled through the high voltage inductance 20 to one terminal of the high voltage winding 21 of the transformer. The other end of the high voltage winding is grounded. The low voltage winding 23 is coupled through a low voltage switch 24 to the power supply 25. Thus, by operation of the switch, the high voltage electrode can be selectively energized.

The pickup electrodes 12 and 13 are coupled to the tap 28 on the high voltage winding of transformer 22 through high voltage inductances 26 and 27 respectively. The electrodes 12 and 13 are also respectively coupled to RC circuits 31 and 32 through the high voltage capacitors 29 and 30 respectively. Terminals A and B are coupled through low voltage capacitors 33 and 34 and the primary winding 35 of the low voltage transformer 36. The secondary winding 37 of the transformer 36 is grounded at one end and is coupled to a high pass filter 38 at the other end of the winding. The signal output from the transformer winding 37 is, thus, applied to the filter 38 and after filtering applied to a pre-amplifier 39. The amplified signal is passed through a gate 40 and after amplification by amplifier 41, is applied to an oscilloscope 42 and a recorder 43.

A triggering circuit 44 is provided to energize winding 45 to pull the armature 46 of the solenoid in against the bias of spring 47, thereby to close switch 24 applying high voltage to the high voltage electrode 14 for a short time period such as one to two cycles at the line frequency. The switch is then opened for a longer period such as ten to twenty cycles at the line frequency to permit dissipation of the heat in the semiconductor shield. To prevent the measuring circuit from being influenced by switching surges, the triggering circuit is also coupled to the gate 40 over lead 48. The triggering circuit provides two pulses. The first pulse closes switch 24 and the second pulse delayed by a time interval sufficient to permit the switching surges to damp out, providing a second pulse transmitted over lead 48 to open gate 40. The second pulse is shorter in duration than the first. Thus, gate 40 is closed prior to opening of the switch 24 to block out any surges introduced upon switch opening. Thus, gate 40 transmits the detected signal only after the switching surges have terminated and is closed off before the switching surges of the switch opening occur.

The pickup electrodes are maintained at the potential of the fluid inside of the insulated tube 11 to prevent spurious corona discharges between the electrode and the tube. For this purpose, the electrodes 12 and 13 are coupled to a high voltage tap 28 on the transformer through the inductances 26 and 27. The inductances are blocking inductances permitting the power frequency to pass but blocking transient voltages due to corona discharges.

The detectors 12 and 13 individually detect corona discharges in the cable in conventional manner, being capacitively coupled to the cable through the liquid 19. To prevent spurious signals caused by noise picked up by the cable conductor 3, it is preferable to employ a balance circuit as shown using the two electrodes 12 and 13. By adjusting the RC circuit 31, the response to noise signals on the conductor core can be made substantially equal in magnitude at points A and B of the detector circuitry. Since the detector signal is taken between points A and B, this will provide noise cancellation. However, in the case of an ionizing void in the cable passing the electrodes 12 and 13, a voltage transient will be generated between points A and B, resulting in a current flow through the primary winding 35 of the transformer 36. This voltage constitutes the detected signal.

Power frequency voltage is filtered from the measuring circuit in three stages. Filtering is done primarily by capacitors 29 and 30 serially coupled to the RC networks 31 and 32, secondly by capacitors 33 and 34 in series with the primary winding 35 and transformer 36 and, finally by the high pass filter 38. The transient voltages passed by the high pass filter 38 are amplified by pre-amplifier 39 and when gate 40 is opened, transmitted through amplifier 41 for display on the oscilloscope 42 and recorder 43. The recorder is adjusted to move synchronously with the cable speed to permit location of voids in the cable by the position of corona pulses on the recorder tape. If the cable is moved as indicated by arrow 44, the corona inception voltage will be determined. If moved in a direction opposite from that of arrow 44, the corona extinction voltage will be determined.

For the purposes of complete disclosure and by way of example, but not by way of limitation, typical parameters for the configuration of FIG. 1 are given in Table I.

TABLE I

| Component: | Component size |
|---|---|
| Insulating tubes 11 and 15. | Each 7 feet long, internal diameter 2.5 inches. |
| Center electrode 14 _ | 6 inches long, diameter 2.5 inches. |
| Grounding electrodes 10 and 16. | Each 6 inches long, diameter 2.5 inches. |
| Pickup electrodes 12 and 13. | Each 6 inches long, diameter corresponding to outer diameter of the insulating tube, space between them 6 inches, located 22 inches from center electrode. |
| High voltage transformer 22. | Secondary voltage variable 0 to 60 kv. with the tap at 65% of whole voltage, secondary current 1 a. |
| Inductance coil 20 _ | 0.1 henry. |
| Inductance coils 26 and 27. | Each 0.1 henry. |
| Capacitors 29 and 30. | Each 1000 pf., 60 kv. |
| RC circuit 32 _____ | 500 pF, resistance 5000 ohms. |
| RC circuit 31 _____ | Variable 0 to 1000 pf., resistance 0 to 10,000 ohms. |
| Capacitors 33 and 34. | Each 1000 pf. |
| Transformer 36 ____ | Ratio 1 to 1. |
| High pass filter 38__ | Cut off frequency 10 k.c.p.s., 40 db. |
| Pre-amplifier 39____ | 60 db, frequency range DC to 1 m.c.p.s. |
| Gate 40 _____ | Response time one microscend. |
| Amplifier 41 _____ | 40 db frequency range DC to 1 m.c.p.s. |
| Triggering circuit 44_ | Duration of the pulse triggering the switch 35 milliseconds, duration of the pulse triggering the gate 17 milliseconds. The gate pulse is delayed 15 milliseconds versus the switch pulse. Repetition ratio 2.5 cycles per second. |

TABLE I—Continued

| Component: | Component size |
|---|---|
| Switch 24 | Operation time—less than 10 milliseconds, designed for continuous switching on and off. |
| Liquid 19 | Mixture of alcohol, glycercol and water. |

The speed of the cable may be adjusted in the range from zero to 50 feet per minute. Recorder speed is synchronized to the cable speed.

The apparatus of FIG. 1 enables the detection of corona discharge in a cable above a preset value of voltage. In some applications, it is desirable to measure the corona inception and extinction voltages in which case, the apparatus of FIG. 2 may preferably be employed.

In FIG. 2, there is shown a payoff reel 101 to support the power cable 102 under test, which cable has a conductor 103, an insulation 104 and a semiconducting insulation shield 105. The cable passes the corona probe 106 and is pulled by the takeup reel 107. The corona probe 106 consists of the first tank 108 with the first washer 109, the first pickup electrode 110, the first insulating tube 111, the first capacitor stack 112, the high voltage cylindrical electrode placed in the center 113, the second insulating tube 114, the second capacitor stack 115, the second pickup electrode 116, the second tank 117 with the second washer 118, and a liquid 119 filling the probe. The center electrode 113 is connected through high voltage inductance 120 to one end of the high voltage winding 121 of the high voltage transformer 122. The other end of the high voltage winding 121 is grounded. The low voltage winding 123 of the transformer 122 is connected to the supply line 124 by means of switch 125. The switch 125 switches on and off the voltage supplying the probe dependently on schedule programmed by the triggering device 126.

Transient voltages due to corona discharges in the cable are detected by two identical pickup circuits 127 and 128. The pickup circuit 127 consists of: capacitor 129 with one end connected to the pickup electrode 110 and with the other end grounded, resistor 130 connected parallel to the capacitor 129, variable capacitor 131 with one end connected to the capacitor stack 112 and the other end grounded, variable resistor 132 connected parallel to the capacitor 131, two capacitors 133 and 134 connected to the primary winding 135 of the transformers 136 and from the other sides connected to the capacitors 129 and 131 respectively, the secondary winding 137 of the transformer 136 which through high pass filter 138 is connected to the preamplifier 139. The pickup circuit 128 is the same and will not be detailed. The outputs of two preamplifiers 139 and 151 are connected through the gate circuit 152 to a dividing circuit 153. The output pulse of the dividing circuit 153 is displayed on the oscilloscope and recorded on the recorder 155. The principle of operation of the apparatus of FIG. 2 is similar to the principle of operation of the apparatus of FIG. 1.

The voltage on a tested portion of cable 102 increases linearly from zero at electrode 110 to maximum at electrode 113 and again to zero at electrode 116. In order to prevent overheating of the cable, the high voltage is switched on only for a short time, for example, one to two cycles of power frequency voltage and then switched off for much longer time, for example, 10 to 20 cycles. This switching on and off of the high voltage is done by means of switch 125 triggered by triggering device 126. The time of one to two cycles of power frequency voltage is sufficient to measure the corona while the time 10 to 20 cycles allows cooling of the cable. In order to prevent registration of switching surges which appear at each switching on and off the voltage, the gate 152 is provided in the measuring circuit. This gate is also triggered by triggering circuit 126. The triggering circuit switches on the high voltage, then with certain delay time, required for switching surges to disappear, opens the gate then closes the gate and switches off the high voltage. This cycle repeats with certain repetition rate depending on time required to cool the cable. Both pickup circuits 127 and 128 are not sensitive to the noise coming through the cable conductor. By proper adjustment of the capacitances 131 and 141 and the resistors 132 and 143, the voltages between points A and B and points A' and B' do not depend on the noise coming through the conductor. However, in case of corona in cable, a voltage transient will appear between points A and B and A' and B'. These voltage transients supply the dividing circuit 153, through capacitors 133 and 134 and 144 and 146, transformers 136 and 148, high pass filters 138 and 150, preamplifiers 139 and 151 and gate 152. Output pulse of the dividing circuit is proportional to the ratio of voltage transient between points A and B to the voltage transients between points A' and B'. This ratio depends on the position of coinciding void in the probe 106. Because voltage distribution on the probe is linear, the location of coinciding void determines the voltage on the cable in place of this void. In other words, the largest output pulse from dividing circuit 153 determines the corona inception or extinction voltage of the cable.

If the cable is passed in the direction of arrow 156, the apparatus shown will measure the corona inception voltage. If the cable direction is reversed, the corona extinction voltage will be measured.

For the purposes of complete disclosure and by way of example, but not by way of limitation, typical parameters for the configuration of FIG. 2 are given in Table II.

TABLE II

| Component: | Component size |
|---|---|
| Insulating tubes 111 and 114 | Each 7 feet long, internal diameter 2.5 inches. |
| Center electrode 113 | 6 inches long, diameter 2.5 inches. |
| Pickup electrodes 110 and 116 | Each 6 inches long, internal diameter corresponding to outer diameter of insulating tubes. |
| Capacitor stacks 112 and 115 | Each consists of 30 cylindrical capacitors with the capacitance of each capacitor 50,000 pf. |
| High voltage transformer 122 | Secondary voltage variable 0 to 60 kv., current 1 a. |
| Inductance coil 120 | 0.1 h. |
| Capacitors 129 and 140 | 500 pf. |
| Capacitors 131 and 141 | Variable 0 to 1000 pf. |
| Resistors 130 and 142 | 5000 ohms. |
| Resistors 132 and 143 | Variable 0 to 10,000 ohms. |
| Capacitors 133, 134, 144, 146 | 1000 pf. |
| Transformers 136 and 148 | Ratio 1 to 1. |
| High pass filters 138 and 150 | Cut off frequency 10 kc.p.s., 40 db. |
| Preamplifiers 139, 151 | 60 db, frequency range D.C. to 1 mc.p.s. |
| Gate 153 | Response time 1 μs. |
| Triggering circuit 126 | Duration of the pulse triggering the switch 35 milliseconds, duration of the pulse triggering the gate 17 milliseconds. The gate pulse is delayed 15 milliseconds versus the switch pulse. Repetition rate 2.5 cycles per second. |

TABLE II—Continued

| Component: | Component size |
|---|---|
| Switch 124 | Operation time less than 10 milliseconds; designed for continuous switching on and off. |
| Liquid 119 | Mixture of alcohol, glycerol and water. |

The speed of the cable may be adjusted in the range from zero to 50 feet per minute. Recorder speed synchronized to the cable speed.

Thus, in the apparatus shown in FIGS. 1 and 2, the same principle of operation is used. The test voltage is applied to the cable only for the short time necessary to measure corona discharge. The voltage is then removed for a significantly longer period to enable the cable to dissipate the heat generated by the voltage stress. In this manner, testing of cable having semiconducting shields thereon is possible without damage to the cable by the test process.

This invention may be variously modified and embodied within the scope of the subjoined claims.

What is claimed is:

1. Apparatus for testing cable having a conductor core, insulation and a semiconducting insulation shield for corona discharge, comprising a corona probe having end walls and an elongated portion between said end walls, each of said end walls being provided with an aperture through which said cable is moved during testing thereof, said end walls being provided with sealing washers engaging said cable, said probe being filled with liquid, a high voltage electrode positoned in said elongated body portion and in contact with said liquid, at least one grounded electrode in said elongated body portion and in contact with said liquid, means including a duty switch for applying a high voltage to said high voltage electrode for a short time interval followed by a longer time interval during which no voltage is applied thereto, detector means capacitively coupled to said cable through an electronic gate for detecting corona discharges during the application of said high voltage to said high voltage electrode, and a triggering circuit which opens the gate after switching surges resulting from closing the duty switch have damped out and which closes the gate prior to the opening of the duty switch.

2. Apparatus for testing cable in accordance with claim 1 in which said means for applying a high voltage to said high voltage electrode comprises a transformer having a primary and a second winding, one end of said secondary winding being grounded, an inductance coupling the other end of said secondary winding to said high voltage electrode, switch means coupling said secondary winding across a source of alternating voltage, and in which the triggering circuit repetitively closes said switch for a short period and opens said switch for a longer period.

3. Apparatus for testing cable in accordance with claim 2 in which said short period comprises no more than two cycles at line frequency and in which said long period comprises no less than ten cycles at said line frequency.

4. Apparatus for testing cable in accordance with claim 1 which includes signal display means and in which the gate means coupling the signal from said detector electrode to said signal display means is operable to couple said detector electrode to said signal display means only during the interval of application of said high voltage to said high voltage electrode.

5. Apparatus for testing cable in accordance with claim 1 in which said detector means comprises a first detector electrode and a second detector electrode positioned on said elongated body portion and being capacitively coupled to said cable, means for detecting a difference in signal voltage between the signals generated on said first and second detectors and which includes signal display means and in which the gate means couples said differential signal to said signal display means only during the time of application of high voltage to said high voltage electrode.

References Cited
UNITED STATES PATENTS

| | | | |
|---|---|---|---|
| 2,321,424 | 6/1943 | Rohats | 324—54 |
| 2,882,491 | 4/1959 | Gooding | 324—54 |
| 3,047,799 | 7/1962 | Peer et al. | 324—54 |
| 3,054,954 | 9/1962 | Boscia et al. | 324—158 |

RUDOLPH V. ROLINEC, *Primary Examiner.*

G. R. STRECKER, *Assistant Examiner.*